(12) United States Patent
Vogel et al.

(10) Patent No.: US 10,906,100 B2
(45) Date of Patent: Feb. 2, 2021

(54) HEAT TREATMENT PROCESS FOR ADDITIVE MANUFACTURED COMPONENTS

(71) Applicant: Power Systems Mfg., LLC, Jupiter, FL (US)

(72) Inventors: Gregory Edwin Vogel, Palm Beach Gardens, FL (US); Jeremy Metternich, Lake Worth, FL (US); Edwin John Kawecki, Jupiter, FL (US); Jacob Snyder, State College, PA (US)

(73) Assignee: POWER SYSTEMS MFG., LLC, Jupiter, FL (US)

( * ) Notice: Subject to any disclaimer, the term of this patent is extended or adjusted under 35 U.S.C. 154(b) by 251 days.

(21) Appl. No.: 16/052,321

(22) Filed: Aug. 1, 2018

(65) Prior Publication Data
US 2019/0039134 A1 Feb. 7, 2019

Related U.S. Application Data

(60) Provisional application No. 62/539,953, filed on Aug. 1, 2017.

(51) Int. Cl.
*B22F 3/10* (2006.01)
*B22F 5/00* (2006.01)
(Continued)

(52) U.S. Cl.
CPC .......... *B22F 3/1028* (2013.01); *B22F 3/1055* (2013.01); *B22F 3/24* (2013.01);
(Continued)

(58) Field of Classification Search
CPC ...... B22F 3/1028; B22F 5/009; B22F 3/1055; B22F 3/24; B22F 5/04; B22F 2998/10;
(Continued)

(56) References Cited

U.S. PATENT DOCUMENTS 9,039,917 B2 5/2015 Szuromi et al.
9,463,506 B2 10/2016 Xu
(Continued)

OTHER PUBLICATIONS

Influence of solution heat treatment on microstructure and stress rupture properties of a Ni3Al base single crystal superalloy IC6SX, Li et al., Intermetallics 19 (2011) pp. 182-186. (Year: 2011).*

*Primary Examiner* — Jessee R Roe
*Assistant Examiner* — Rebecca Janssen
(74) *Attorney, Agent, or Firm* — Hovey Williams LLP

(57) ABSTRACT

A method for manufacturing and heat treating a component formed from an alloy or superalloy. The component may be part of a gas turbine engine, such as an airfoil of a gas turbine engine turbine, or a combustor fuel nozzle, that includes internal cooling passages. At least part of the component is formed from the alloy or superalloy using an additive manufacturing process. The method includes determining an incipient melting point range and a recrystallization temperature of the alloy or superalloy. The component is then heated to at least the recrystallization temperature and within the incipient melting point range for a predetermined time, and ultimately cooled.

18 Claims, 7 Drawing Sheets

(51) Int. Cl.

| | |
|---|---|
| *B22F 3/105* | (2006.01) |
| *B22F 3/24* | (2006.01) |
| *B22F 5/04* | (2006.01) |
| *B33Y 10/00* | (2015.01) |
| *F01D 5/18* | (2006.01) |
| *C22F 1/10* | (2006.01) |
| *B33Y 40/00* | (2020.01) |
| *B33Y 80/00* | (2015.01) |

(52) U.S. Cl.
CPC ............... *B22F 5/009* (2013.01); *B22F 5/04* (2013.01); *B33Y 40/00* (2014.12); *C22F 1/10* (2013.01); *B22F 2003/248* (2013.01); *B22F 2998/10* (2013.01); *B33Y 10/00* (2014.12); *B33Y 80/00* (2014.12); *F01D 5/187* (2013.01); *F05D 2230/22* (2013.01); *F05D 2230/31* (2013.01)

(58) Field of Classification Search
CPC ...... B22F 2003/248; C22F 1/10; B33Y 40/00; B33Y 10/00; B33Y 80/00; F01D 5/187; F05D 2230/22; F05D 2230/31
See application file for complete search history.

(56) References Cited

U.S. PATENT DOCUMENTS

| | | | |
|---|---|---|---|
| 2014/0169981 A1* | 6/2014 | Bales | ................. B22F 5/04 416/96 R |
| 2017/0080543 A1 | 3/2017 | Ocken | |
| 2017/0197278 A1 | 7/2017 | Garry et al. | |

* cited by examiner

HEAT TREATMENT PROCESS FOR ADDITIVE MANUFACTURED COMPONENTS

CROSS-REFERENCE TO RELATED APPLICATION

This nonprovisional application claims the benefit of priority of U.S. Provisional Application No. 62/539,953, filed Aug. 1, 2017, and titled "HEAT TREAT PROCESS FOR ADDITIVE MANUFACTURE," which is incorporated by reference herein in its entirety.

TECHNICAL FIELD

The present invention generally relates to methods for manufacturing components, and more particularly relates to methods for manufacturing components from components formed by additive-manufacturing processes.

BACKGROUND OF THE INVENTION

Components with relatively complex three-dimensional (3D) geometries are difficult to fabricate using conventional techniques, such as forging, casting, or machining. Additive manufacturing (AM) processes have been developed to fabricate these complex three-dimensional components, including components with internal surfaces defining internal passages—hollow areas, internal channels, and openings—for cooling or weight reduction. Additive manufacturing is the process of joining materials to make objects from 3D-model data, usually layer upon layer, as opposed to subtractive manufacturing methodologies, such as traditional machining and casting. Examples of additive manufacturing processes include: micro-pen deposition in which liquid media is dispensed with precision at the pen tip and then cured; selective laser sintering in which a laser is used to sinter a powder media in precisely controlled locations; laser wire deposition in which a wire feedstock is melted by a laser and then deposited and solidified in precise locations to build the product; electron beam melting; laser engineered net shaping; selective laser melting in which a laser is used to melt a powder media in preceisely controlled locations; laser powder bed fusion which fuses powder media together; and direct metal deposition. In general, additive manufacturing techniques provide flexibility in free-form fabrication without geometric constraints, fast material processing time, and innovative joining techniques.

Components manufactured from additive manufacturing processes, however, may have significant surface roughness, porosity, and cracks. Further, cracks may develop at these interfaces or cut through or across deposit layers due to stresses inherent with the additive manufacturing process and/or the metallurgy of the build material.

To eliminate internal porosity and cracking, it is known in the art to utilize a hot isostatic pressing (HIP) processing cycle after additive manufacturing fabrication. However, HIP processing will not reduce surface porosity, surface cracks, and internal porosity or cracks that are connected to the surface of the component. It is known to utilize stress relief heat treatment processes and HIP processes to reduce defects such as porosity and cracks. Also, it is known to those skilled in the art to perform a recrystallization heat treatment process on materials with significant grain directionality to modify grain size, make the grains more uniform and so by to produce more uniform material properties (more isotropic). Recrystallization heat treatment, while known, is not a process traditionally used in heat treating materials as it takes those materials right to the point of melting and so carries additional risks without benefits for conventionally forged and cast materials.

Surface roughness may interfere with the functionality of the component being manufactured. For example, excessive surface roughness may restrict or impede airflow, collect debris, or act as a stress riser. Reducing internal passage surface roughness presents a challenge because of the general inaccessibility of the internal passage surfaces. Conventional polishing or milling techniques to reduce internal cooling passage surface roughness are not as developed as they are for external surfaces. Expensive methods which utilize proprietary equipment have been developed to reduce internal passage roughness, such as abrasive flow machining. No efficient and cost-effective process exists to uniformly reduce internal cooling passage surface roughness to acceptable levels, thereby compromising the structural integrity, cosmetic appearance, functionality, and mechanical properties of the component.

Surface roughness is a key concern of additively manufactured cooling features as compared to castings. High surface roughness on external surfaces or internal channel walls may act to hinder component functionality. For example, turbine airfoil components such as blades and vanes typically specify upper external surface roughness limits to maintain aerodynamic gas flow design parameters. Components with internal flow channels, such as air cooling or fuel delivery channels, are typically desired to have a channel wall surface roughness below specified limits to control pressure drop through the channel, maintain constant heat transfer properties, promote efficient flow, and reduce fouling of channels by debris. External surfaces exhibiting unduly high surface roughness may additionally detract from mechanical properties of the component. For instance, a high surface roughness may promote fatigue crack initiation, reducing the life of components relative to those having a smoother surface.

Thus, significant effort is expended within industry to reduce surface roughness to acceptable levels. For example, U.S. Pat. No. 9,039,917 describes a process of diffusing material to a component surface and then removing the diffusion layer to reduce surface roughness. Most of the effort concentrates on optimizing parameters of the additive manufacturing machine, with only limited success. For example, U.S. Pat. No. 9,463,506 describes a process of modifying component surface roughness by creating a mold within an additively manufactured part then melting the material and removing the mold. U.S. Patent Application No. 2017/0080543 describes the use of an abrasive flow to decrease surface roughness. U.S. Patent Application No. 2017/0197278 describes a creation process modification wherein the additive manufacturing machine utilizes a laser to heat an area surrounding the melt target to increase cooldown rates during component formation. Research is pointing to a very strong dependency between roughness variability and laser pattern used for a given geometry/shape.

Accordingly, it is desirable to provide methods for manufacturing components from articles formed by additive manufacturing processes. It is also desirable to provide methods that uniformly reduce surface roughness, including internal passage surface roughness, thereby improving the heat transfer and flow characteristics, structural integrity, cosmetic appearance, functionality, mechanical properties, and fatigue life/strength of the component. Furthermore, other desirable features and characteristics of the present invention will become apparent from the subsequent detailed description of the invention and the appended claims, taken in conjunction with the accompanying drawings and this background of the invention.

SUMMARY

Additively manufactured parts have a natural grain non-uniformity characterized by long columnar grains with anisotropic (directional) material properties. Recrystallization heat treatment applied to additively manufactured parts significantly reduces this columnar structure by bringing the material to near melting (incipient melting). When brought to this state, which is not used in normal material processing, it was found that the very rough surface morphology, naturally generated by the layered melting AM process was much reduced. This significant reduction in roughness has very beneficial consequences to the heat transfer and flow properties of designs so fabricated.

In that regard, embodiments of the present invention are directed to a method of manufacturing components from an alloy, including heat treating such components by heating the components to a temperature within the alloy's incipient melting point range. Other embodiments of the present invention are directed to manufacturing components of a gas turbine engine, such as components of a gas turbine engine's turbine and combustor, from a superalloy, including heat treating such components by heating the components to a temperature within the superalloy's incipient melting point range.

More particularly, some aspects of the present invention are directed to a method for manufacturing a component from an alloy. The method includes forming at least a portion of a component from an alloy using an additive manufacturing process and determining an incipient melting point range of the alloy. The method also includes determining a recrystallization temperature of the alloy, the recrystallization temperature being a temperature located within the incipient melting point range. The component is heated to at least the recrystallization temperature and within the incipient melting point range for a predetermined time, and then cooled.

Other aspects are directed to a method for manufacturing a component of a gas turbine engine such as fuel nozzles and swirl vanes of a combustor. The component is manufactured from an additive manufacturing process from a superalloy, and then is heat treated as described above.

Still other aspects of the present invention are directed to a method of manufacturing a component of a gas turbine engine having internal cooling passages. The component with internal cooling passages is manufactured from an additive manufacturing process from a superalloy, and then is heat treated as described above.

Additional advantages and features of the present invention will be set forth in part in a description which follows, and in part will become apparent to those skilled in the art upon examination of the following or may be learned from practice of the invention.

BRIEF DESCRIPTION OF THE DRAWINGS

The present invention will hereinafter be described in conjunction with the following drawing figures, wherein like numerals denote like elements, and wherein.

DETAILED DESCRIPTION

Figure 1:
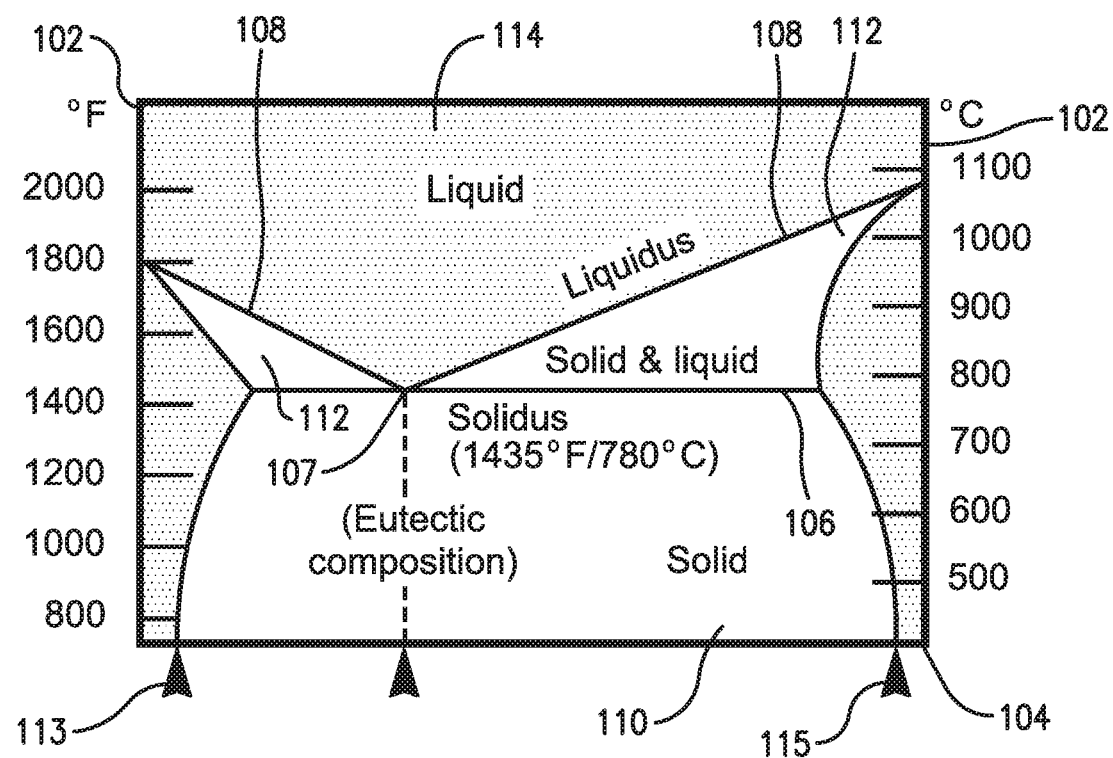
FIG. 1 is a phase diagram showing the melting temperature range phenomenon of an alloy.

The following detailed description is merely exemplary in nature and is not intended to limit the invention or the application and uses of the invention. The embodiments described herein are exemplary embodiments provided to enable persons skilled in the art to make or use the invention and not to limit the scope of the invention which is defined by the claims.

Various embodiments are directed to methods for manufacturing components from articles formed by an additive manufacturing process such as electron beam melting or direct metal laser fusion in which sequential deposit layers of build material are fused and solidified according to a three-dimensional (3D) model. Other additive manufacturing processes may also be employed.

During additive manufacturing, multiple layers of melted material are created from alloy particulates approximately 5 microns in diameter inside a process chamber filled with inert gas where a laser beam, or other means, produces a local melting spot where the metallic powder is fused to an underlying material layer or substrate to build up a component. Other size particulates may be utilized without departing from the scope of the invention. For example, in some embodiments the additive manufacturing process may use particulates ranging in size from, for example, 1 micron to 15 microns in diameter. In some embodiments, each of these build layers are between 10 and 100 microns thick, and more particularly between 20 and 50 microns thick, and in some embodiments approximately 30 microns thick.

The as-built article may have significant surface roughness caused by, for example, partial fusion or entrainment of metallic powder as the laser starts or stops as it traverses or sweeps at the edges of each deposit layer, and by contamination, debris, oxidation, or the like. As used herein, the term "surface roughness" includes roughness at the surface, near surface (the roughness associated with loosely adhered particles), and subsurface (the surface-connected defects contributing to roughness). This surface roughness is substantially greater than that observed during casting. For example, additive manufacturing techniques may result in a surface roughness of approximately 800 Ra, whereas conventional unfinished casting roughness is approximately 300 Ra.

Excessive surface roughness may be particularly problematic when additive manufacturing processes are used to create components having relatively small internal passages such as cooling passages, and the surface roughness may cause resistance to cooling fluid flow and thus heat transfer through the component. That is, rough component fluidic surfaces increase turbulence and form drag due to metallic particles fused to the sides of the passage. These generate a decrease in effectiveness of surfaces designed for interaction with a fluid medium such as air, fuel, or water. Reducing surface roughness improves the aerodynamic and heat transfer characteristics, as well as the structural integrity, cosmetic appearance, functionality, fatigue life/strength, and mechanical properties of the component. Unfortunately, reduction of internal passage surface roughness—such as, for example, interior cooling channels of a gas turbine engine component including a vane, blade, other combustor component, or the like—presents a challenge because of the general inaccessibility of the internal passage surfaces.

According to exemplary embodiments described herein, a heat treatment process heats a component composed of a superalloy to within the superalloy's incipient melting point range such that recrystallization may occur. This process has been found to considerably reduce internal passage roughness. Thermal processing of as-manufactured samples as compared to samples that have undergone a heat treatment within the incipient melting point range have indicated a significant change in roughness in flow results, profilometer traces, and electron microscope and CT scans.

The melting of a superalloy occurs over a range of temperatures, referred to herein as the incipient melting point range. More particularly, the incipient melting point range is defined as the range of temperatures between the points where areas with high local alloy content melt prior to the remaining material (i.e., material exhibits both liquid and solid phases) to the point of phase change to a liquid phase. This may be best understood with reference to FIGS. 1 and 2.

As will be appreciated by one skilled in the art, FIG. 1 is an illustrative phase diagram for a hypothetical alloy—in some embodiments, a superalloy—at a given pressure (e.g., one atmosphere). The phase diagram includes a vertical temperature axis 102 and a horizontal percentage-composition axis 104. The phase diagram further includes a solid phase field 110, a solid/liquid phase field 112, and a liquid phase field 114. The solid phase field 110 is generally separated from the solid/liquid phase filed 112 by the solidus boundary 106, which for the hypothetical alloy shown is a horizontal line at 1435° F. (780° C.). The solid/liquid phase field 112 is generally separated from the liquid phase field 114 by the liquidus boundary 108, the temperature of which varies in relation to the specific percentage composition of the hypothetical alloy.

As should be appreciated, when the hypothetical alloy is formed with a percentage composition and a temperature combination lying within the solid phase field 110, the alloy will be in a solid phase. When formed with a percentage composition and a temperature combination lying within the solid/liquid phase field 112, the alloy will be partially solid and partially liquid. And when formed with a percentage composition and a temperature combination lying within the liquid phase field 114, the alloy will be in liquid form.

The range of temperatures for a given composition of the alloy that falls within the solid/liquid phase field 112 is referred to herein as the incipient melting point range. Put another way, for a given composition of the alloy, the incipient melting point range is defined temperatures above the solidus boundary 106 but below the liquidus boundary 108. In some embodiments, a specific composition of the alloy may result in no incipient melting point range. For example, in FIG. 1, the solidus boundary 106 and liquidus boundary 108 meet a eutectic point 107, such that the alloy having a composition corresponding to the eutectic point 107 (referred to as a eutectic composition) will exhibit no incipient melting point range, but instead pass from solid to liquid when heated above the solidus boundary 106 temperature.

Figure 2:
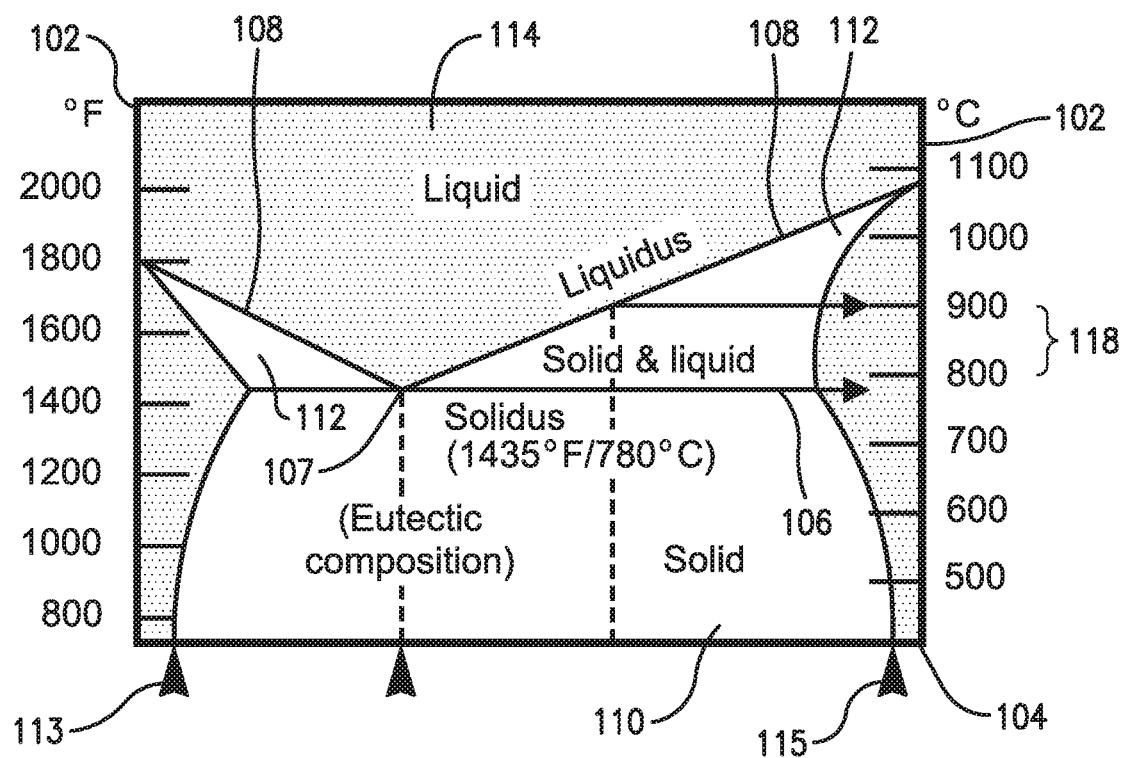
FIG. 2 is the phase diagram shown in FIG. 1, including the composition of a hypothetical alloy plotted thereon.

FIG. 2 illustrates the incipient melting point range for a specific composition 116 of the hypothetical alloy discussed in connection with FIG. 1. As will be appreciated by those skilled in the art, a composition of the hypothetical alloy that falls very near point 113 on the composition axis 104 will be composed almost entirely of a first constituent of the alloy and contain very little of the second constituent. In contrast, a composition of the hypothetical alloy that falls very near point 115 on the composition axis 104 will contain almost none of the first constituent and instead by composed almost entirely of the second constituent. In the example shown in FIG. 2, the specific composition 116 illustrated has a composition including approximately two-thirds of the first constituent component of the hypothetical alloy, and one-third of the second constituent component of the hypothetical alloy. For simplicity, this specific composition 116 will be referred to herein as "Alloy B." As can be seen, Alloy B will fall within the solid/liquid phase field when heated or cooled to a temperature between approximately 780° C. and 900° C. This temperature range, denoted using numeral 118 in FIG. 2—that is, numeral 118 shows Alloy B's incipient melting point range. When Alloy B is heated to a temperature within its incipient melting point range 118, Alloy B's grain structure changes, including the merging of adjacent grains within the alloy. This merging reduces the columnar anisotropic grains to lower aspect ratios more representative of isotropic materials, in turn reducing the component's surface roughness. This may be better understood with reference to FIG. 3.

Figure 3:
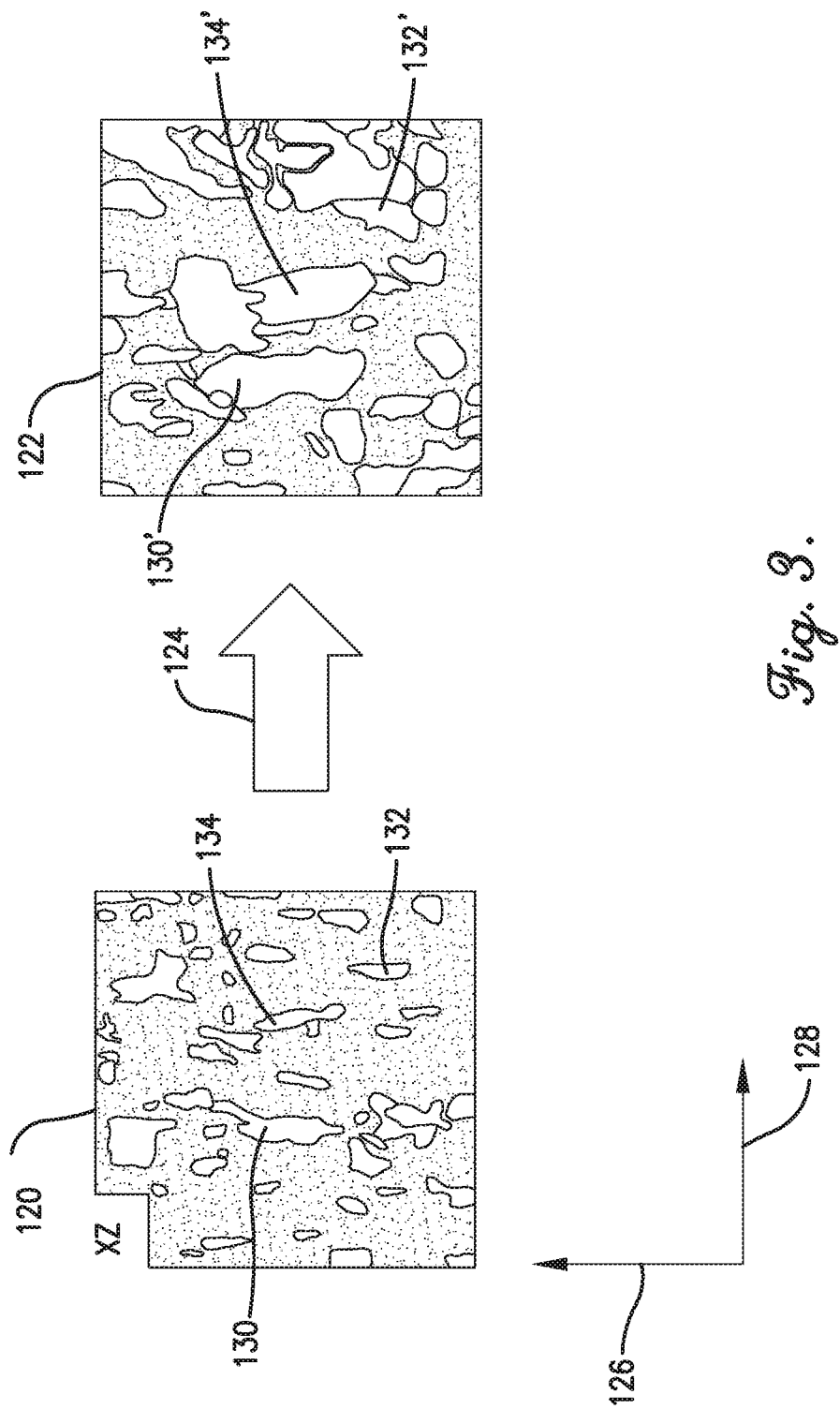
FIG. 3 is a representation of the changes in grain structure of a superalloy undergoing a recrystallization heat treatment process according to aspects of the invention.

FIG. 3 depicts the grain structure 120 of a superalloy used to form an additive manufactured component before a recrystallization heat treatment process 124, as well as the grain structure 122 following the heat treatment process 124. The recrystallization heat treatment process 124 of the present invention heats an additive manufactured component—such as a component of a gas turbine engine including a blade, vane, other combustor component, etc.—to within the incipient melting point range of the superalloy from which the component is fabricated. Heating the additive manufactured component to within the incipient melting point range results in significant crystal structure and other morphological changes to occur within the component but does not otherwise distort the shape of the additive manufactured component to a significant degree. During this process, the unmelted and partially melted particles at or near the passage walls forming the surface roughness of the internal passages—e.g., the internal cooling passages of a gas turbine engine vane, blade, other combustor component, etc.—merge back into the surface resulting in a significant smoothing of the internal passage.

In some embodiments, the process 124 includes heating the additive manufactured component to near the component's melting point—i.e., the temperature of the component's liquidus boundary 108 for the given composition. For example, in some embodiments, the additive manufactured component may be heated to at least 95% of its liquidus boundary temperature, and in some embodiments may be heated to within approximately 98% of its liquidus boundary temperature. In other embodiments, the additive manufactured component may be heated to a predetermined temperature differential of its liquidus boundary temperature. For example, in some embodiments the additive manufactured component may be heated to within approximately 50° F. of its liquidous boundary temperature.

Returning to FIG. 3, the grain structure 120 includes a plurality of grains, including grains 130, 132, and 134, among others. The recrystallization heat treatment process 124 causes grains to grow laterally through merging with adjacent grains. More particularly, prior to the heat treatment process 124, the additive manufactured component's grains 130, 132, 134, are much longer than they are wide. That is, a ratio of a length of each grain 130, 132, 134—i.e., a dimension of the grain in the vertical axis 126—to a width of each grain 130, 132, 134—i.e., a dimension of the grain in the horizontal axis 128—is much greater than 1.0. However, following the heat treatment process 124, the grains 130', 132', 134' have merged with adjacent grains, causing them to grow laterally (grow in the size in a direction along the horizontal axis 128). In that regard, following the heat treatment process 124, a ratio of a length of each grain 130', 132', 134' to a width of each grain 130', 132', 134' is nearer to 1.0 than before the heat treatment process 124. Put another way, during the heat treatment process 124 there is proportionally less growth along the vertical axis 126 of the grains than along the horizontal axis 128. And because the heat treatment process 124 thus reduces the grain aspect ratio, the anisotropy of recrystallized materials is also reduced.

Figure 4:
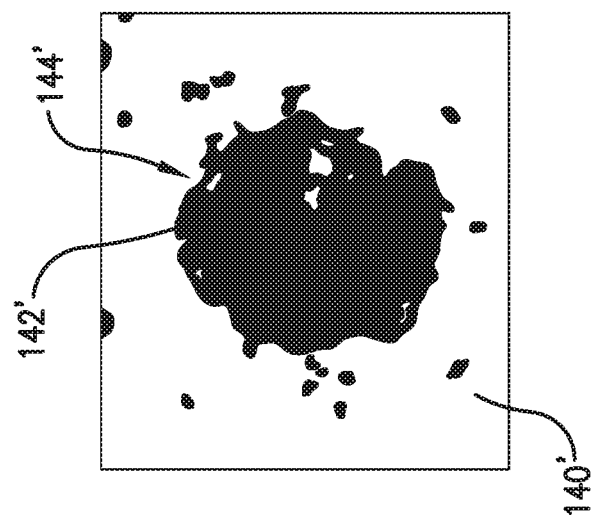
FIG. 4 is a representation of the changes in surface roughness of a superalloy undergoing the recrystallization heat treatment process.
Figure 4:
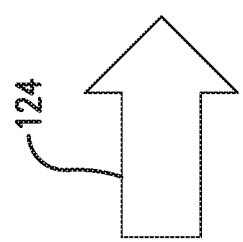
Figure 4:
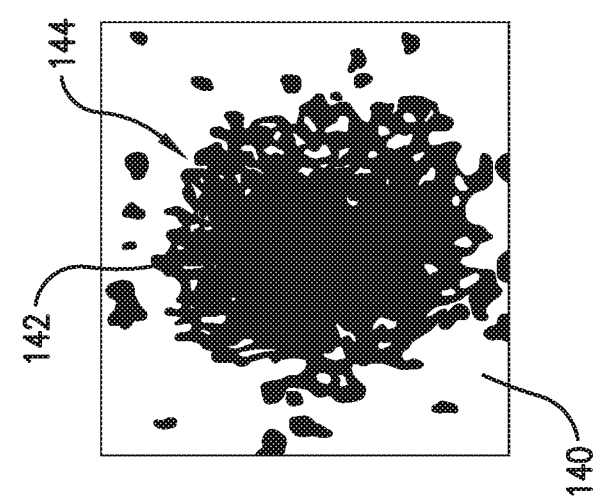

This recrystallization heat treatment process 124 in turn reduces the surface roughness of the additive manufactured component. This may be best understood with reference to FIGS. 4 and 5. First, FIG. 4 depicts a coupon 140 of a superalloy including a hole 142 formed therein before and after being subjected to the recrystallization heat treatment process 124 described above. As should be appreciated, a coupon is a sample of a material—here, an alloy, superalloy, or similar—that is used to test a material treatment process, such as the recrystallization heat treatment process 124 of the instant invention. The pre-heat-treatment coupon 140 includes considerable surface roughness, shown by the relatively hazy outer boundary 144 of hole 142. The post-heat-treatment coupon 140', on the other hand, includes reduced surface roughness, shown by relatively smooth outer boundary 144' of the hole 142'. As can be seen, using the recrystallization heat treatment process 124 for additive manufactured components parts yields a significant surface roughness benefit by achieving properties close to cast parts, hence ensuring cooled components operate as designed with improved flow and heat transfer characteristics and thus improved durability. Utilizing this recrystallization heat treatment process 124 achieves an apparent surface roughness reduction of at least half over a traditionally processed additively manufactured component. The process may also improve the low-cycle-fatigue (LCF) and fracture toughness of the material as microcracks and surface flaws within passages are smoothed when the surface roughness is reduced.

Figure 5:
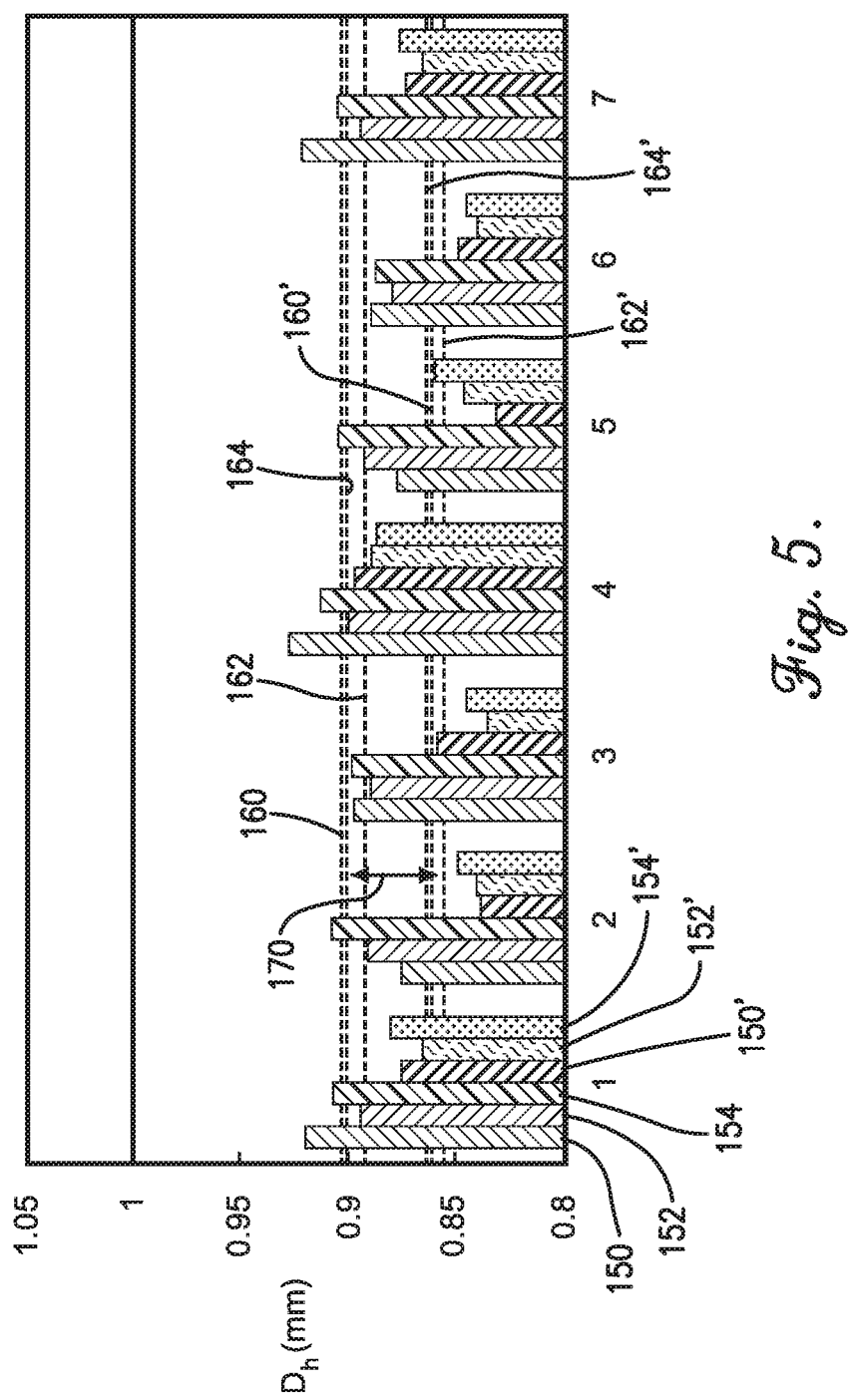
FIG. 5 is a graph showing a hydraulic diameter reduction for various samples of a superalloy undergoing the recrystallization heat treatment process.

FIG. 5 depicts a graph showing the hydraulic diameter for the internal cooling passage of various coupons subjected to the described recrystallization heat treatment process 124. One skilled in the art will appreciate that hydraulic diameter is a parameter proportional to surface roughness, such that a greater surface roughness results in a larger hydraulic diameter, while decreased surface roughness will result in a smaller hydraulic diameter. FIG. 5 graphs the hydraulic diameter for three different coupons, pre- and post-heat treatment, in seven different testing conditions. For each testing condition—labeled 1 to 7 on the horizontal axis—the first three bars depict the hydraulic diameter for pre-heat-treated coupons, and the second three bars depict the hydraulic diameter for post-heat-treated coupons. For example, with reference to testing condition no. 1, bars 150, 152, and 154 show the hydraulic diameter of three pre-heat-treated coupons, with bars 150', 152', and 154' showing the hydraulic diameter of the three coupons following heat treatment, respectively.

As can be seen in FIG. 5, the hydraulic diameter for each heat-treated coupon reduced significantly for each testing condition. To better illustrate the point, FIG. 5 includes horizontal lines 160, 162, and 164 showing the average hydraulic diameter from all seven testing conditions for coupons 150, 152, and 154, respectively, prior to heat treatment, and horizontal lines 160', 162', and 164' show the average hydraulic diameter from all seven testing conditions for each coupon 150', 152', and 154', respectively, following heat treatment. As depicted via double arrow 170, all coupons experienced a statistically significant decrease in average hydraulic diameter, demonstrating the effectiveness of the described recrystallization heat treatment process 124.

In some embodiments of the instant invention, the particular recrystallization temperature used for heat treating the additive manufactured component is determined within the incipient melting point range by performing a material property analysis, for example, a differential thermal analysis, to determine the melting range of the alloy. The temperature is then set to a value near, but below the onset of melting—e.g., the liquidus boundary 108 temperature—accounting for furnace tolerance. Preferably, the recrystallization heat treatment process 124 takes the additive manufactured component to a temperature that is approximately 95% of the liquidus boundary temperature. More preferably, the recrystallization heat treat process takes the additive manufactured article to a temperature that is approximately 98% of the liquidus boundary temperature.

Figure 6:
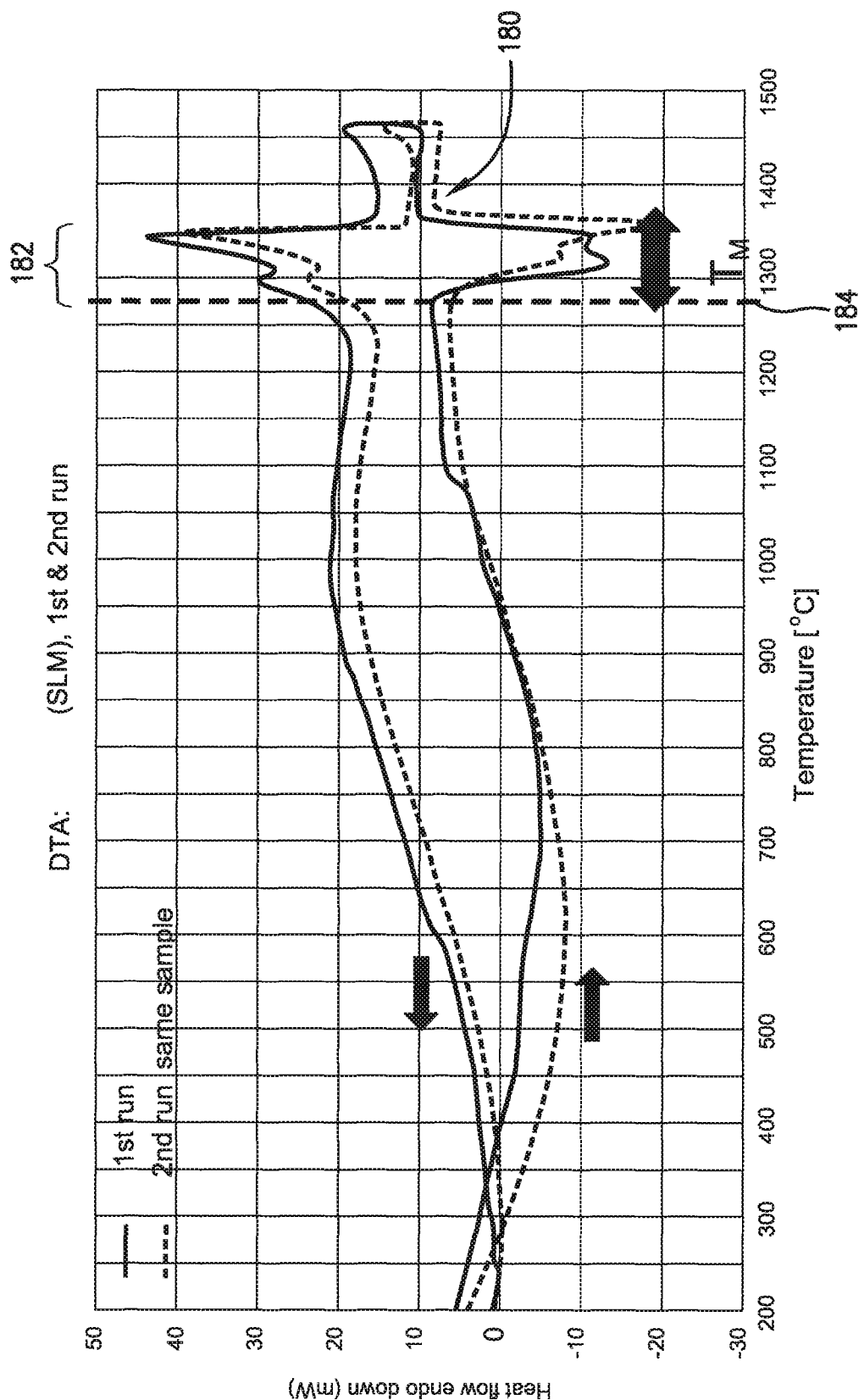
FIG. 6 is a graph showing an exemplary superalloy's incipient melting point range as empirically determined.

This may be better understood with reference to a specific example. The recrystallization heat treatment process 124 of the present invention was used for a sample made of Inconel 939 or a derivative thereof. Inconel 939 composition is 22.4Cr, 19Co, 1.9Al, 3.7Ti, 1.4Ta, 1.6W, 0.1Zr, 0.15C, 1Nb, Balance Ni. It should be appreciated, however, that the described process is not limited to Inconel 939, and in other embodiments could be used for an additive manufactured component constructed from a different alloy or superalloy. Differential thermal analysis was used to determine the melting range of the Inconel 939. More particularly, FIG. 6 plots the heat flow into a sample of Inconel 939 versus temperature. As seen, heat flow is relatively steady at temperatures below approximately 1270° C. At that temperatures, there is a rapid change in heat flow, indicative of increased endothermic reaction, which continues until about 1350° C. This range, labeled with reference numeral 182, is indicative of phase change from solid to liquid, and thus is Inconel 939's incipient melting range ($T_M$). The upper end of this range, labeled with reference numeral 180, is determined to be the melting point; i.e., the temperature wherein the entire superalloy becomes liquid.

For this example, a recrystallization temperature 184 ($T_{in}$) was determined to be a temperature within the superalloy's incipient melting point range 182, yet still below the superalloy's melting temperature 180 (i.e., liquidus boundary). That is, the recrystallization temperature 184 was determined to be a temperature (i.e., 2280° F. (1250° C.)±25° F. (10° C.)) within the initial stages of the melting process and within approximately 50° F. of the temperature where morphological changes occur. The sample was heated to 2280° F. (1250° C.)±25° F. (10° C.) in Argon for 8 hours±15 minutes. The sample was then cooled at a rate of approximately 35° F. per minute to below 1100° F. This heat treatment took the Inconel 939 sample to approximately 98.5% of the fully melted range.

Test results demonstrate that the particles comprising surface roughness are no longer present after treating the material as described above. This suggests the surface particles and roughness have been assimilated by the sample. Assessments show all melt pool artifacts disappear and the grains become more rounded at a heat treatment temperature occurring within the incipient melting point range 182—in this case approximately 50° F. below the melting point 180.

Figure 7:
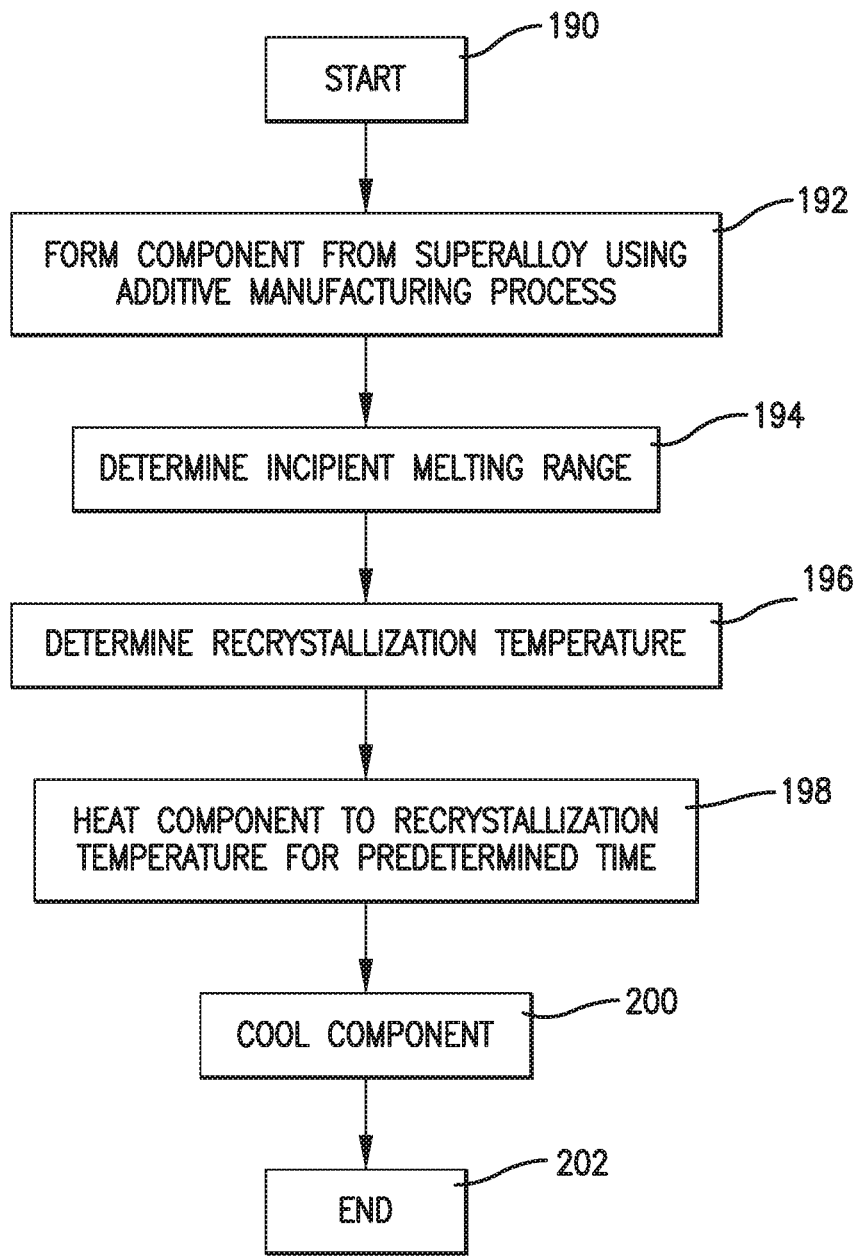
FIG. 7 is a flowchart showing a method for heat treating an additive manufactured component according to aspects of the invention.

Turning now to FIG. 7, a flowchart showing a process for heat treating an additive manufactured component according to some aspects of the invention is shown. The process begins at step 190, then proceeds to step 192 where a component is manufactured from a superalloy using an additive manufacturing process. In some embodiments, the component may be a component of a gas turbine engine, such as a combustor component including internal cooling passages or channels. For example, the component may be a blade, combustor component such as a fuel nozzle, or vane of a gas turbine engine that has internal cooling passages formed therein. Other components of gas turbine engines, combustors, or even components unrelated to gas turbine engines can be formed using the process described herein without departing from the scope of the invention. In some embodiments, the component is formed from a superalloy such as Inconel 939 or a derivative thereof.

At step 194, an incipient melting point range of the superalloy is determined. As discussed in connection with FIGS. 1, 2, and 6, the incipient melting point range is a range of temperatures where portions of the superalloy exist in solid form, while others exist in liquid form. More particularly, the incipient melting point range is a range within the solid/liquid phase field 112 shown in FIG. 1 and is a range of temperatures located between the solidus boundary 106 and liquidus boundary 108 for a given composition of the superalloy. In some embodiments, and as discussed in connection with FIG. 6, the incipient melting point range can be empirically determined by monitoring the heat flow into a sample of the superalloy as the superalloy is heated. The incipient melting point range can be determined as the range of temperatures exhibiting increased endothermic reaction indicative of phase change.

At step 196, a recrystallization temperature is determined. In some embodiments, the recrystallization temperature is a temperature within the incipient melting point range but less than the melting temperature (i.e., liquidus boundary temperature). In some embodiments, the recrystallization temperature is at least 95% of the melting temperature, and more preferably at least 98% of the melting temperature. In other embodiments, the recrystallization temperature may be determined to be a temperature within a certain range of the melting temperature. For example, in some embodiments the recrystallization temperature may be determined to be a temperature within approximately 50° F. of the melting temperature.

At step 198, the component is heat treated by heating the component to at least the recrystallization temperature, but still within the incipient melting point range, for a predetermined amount of time. The step may be heated in a chamber filled with an inert gas such as Argon or similar and may be heated at or above the recrystallization temperature, while still remaining within the incipient melting point range, for about 8 hours. In other embodiments, the component may be heated for a different predetermined amount of time without departing from the scope of this invention.

At step 200 to component is cooled. In some embodiments, the component may be cooled at a controlled rate. For example, the component may be cooled at a controlled rate of about 35° F. per minute until the part reaches a certain temperature (e.g., 1100° F.). Finally, the process then ends at step 202.

It is known to recrystallize a material to improve strength and ductility parameters by controlling gamma and gamma prime precipitates. But the use of incipient melting temperature ranges to perform this recrystallization to gain a combination of reduced grain anisotropy and roughness reduction is not known to one skilled in the art. This heat treatment results in surface roughness and hydraulic diameter decrease.

The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects set forth above, together with other advantages which are obvious and inherent to the system and method. It will be understood that certain features and sub-combinations are of utility and may be employed without reference to other features and sub-combinations. This is contemplated by and within the scope of the claims.

Moreover, while at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will enable those skilled in the art to implement an exemplary embodiment of the invention. It being understood that various changes may be made in the function and arrangement of elements described in an exemplary embodiment without departing from the scope of the invention as set forth in the appended claims.

What is claimed is:

1. A method for manufacturing a component from an alloy, the method comprising:
   forming at least a portion of a component from a non-eutectic alloy using an additive manufacturing process;
   determining an incipient melting range of the alloy, wherein the incipient melting range is a range of temperatures from a solidus boundary temperature of the alloy to a liquidus boundary temperature of the alloy;
   determining a recrystallization temperature of the alloy, the recrystallization temperature being a temperature located within the incipient melting range;
   heating the component to at least the recrystallization temperature and within the incipient melting range for a predetermined time, wherein the component has a decreased surface roughness following the heating step relative to the component prior to the heating step; and
   cooling the component.

2. The method of claim 1, wherein the additive manufacturing process is one of a selective laser sintering process, a selective laser melting process, a laser wire deposition process, a laser powder bed fusion process, an electron beam melting process, a laser engineered net shaping process, and a direct metal deposition process.

3. The method of claim 1, wherein forming the portion of the component comprises forming the component with an internal passage.

4. The method of claim 3, wherein the component is one of a gas turbine engine blade, a gas turbine engine combustor component, and a gas turbine engine vane.

5. The method of claim 4, wherein forming the component with the internal passage comprises forming the one of the gas turbine engine blade, the gas turbine engine combustor component, and the gas turbine engine vane with an internal cooling passage.

6. The method of claim 1, wherein the recrystallization temperature is at least equal to the solidus boundary temperature plus 95% of the difference between the liquidus boundary temperature and the solidus boundary temperature.

7. The method of claim 6, wherein the recrystallization temperature is at least equal to the solidus boundary temperature plus 98% of the difference between the liquidus boundary temperature and the solidus boundary temperature.

8. The method of claim 6, wherein the recrystallization temperature is at least within 50° F. of the liquidus boundary temperature.

9. The method of claim 1, wherein determining the incipient melting range of the alloy comprises testing a sample of the alloy, the sample being a specimen formed from the alloy that is separate from the component.

10. A method for manufacturing a component of a gas turbine engine, the method comprising:
forming at least a portion of a component of a gas turbine engine from a non-eutectic superalloy using an additive manufacturing process, the component being one of a blade and a vane of the gas turbine engine, wherein the one of the blade and the vane includes an internal cooling passage;
determining an incipient melting range of the superalloy, wherein the incipient melting range is a range of temperatures from a solidus boundary temperature of the superalloy to a liquidus boundary temperature of the superalloy;
determining a recrystallization temperature of the superalloy, the recrystallization temperature being a temperature located within the incipient melting range;
heating the one of the blade and the vane to at least the recrystallization temperature and within the incipient melting range for a predetermined time, wherein the internal cooling passage has a decreased hydraulic diameter following the heating step relative to the internal cooling passage prior to the heating step; and
cooling the one of the blade and the vane.

11. The method of claim 10, wherein the additive manufacturing process is one of a selective laser sintering process, a selective laser melting process, a laser wire deposition process, a laser powder bed fusion process, an electron beam melting process, a laser engineered net shaping process, and a direct metal deposition process.

12. The method of claim 10, wherein the recrystallization temperature is at least equal to the solidus boundary temperature plus 95% of the difference between the liquidus boundary temperature and the solidus boundary temperature.

13. The method of claim 12, wherein the recrystallization temperature is at least equal to the solidus boundary temperature plus 98% of the difference between the liquidus boundary temperature and the solidus boundary temperature.

14. The method of claim 12, wherein the recrystallization temperature is at least within 50° F. of the liquidus boundary temperature.

15. The method of claim 10, wherein determining the incipient melting range of the superalloy comprises testing a sample of the superalloy, the sample being a specimen formed from the superalloy that is separate from the one of the blade and the vane of the gas turbine engine.

16. A method for manufacturing a component of a gas turbine engine having internal cooling passages, the method comprising:
forming at least a portion of a component of a gas turbine engine from a non-eutectic superalloy using an additive manufacturing process, wherein forming the component of the gas turbine engine includes forming an internal cooling passage within the component of the gas turbine engine;
determining an incipient melting range of the superalloy, wherein the incipient melting range is a range of temperatures from a solidus boundary temperature of the superalloy to a liquidus boundary temperature of the superalloy;
determining a recrystallization temperature of the superalloy, the recrystallization temperature being a temperature located within the incipient melting range;
heating the component of the gas turbine engine to at least the recrystallization temperature and within the incipient melting range for a predetermined time, wherein the internal cooling passage has a decreased surface roughness following the heating step relative to the internal cooling passage prior to the heating step; and
cooling the component of the gas turbine engine at a constant rate.

17. The method of claim 16, wherein the additive manufacturing process is one of a selective laser sintering process, a selective laser melting process, a laser wire deposition process, a laser powder bed fusion process, an electron beam melting process, a laser engineered net shaping process, and a direct metal deposition process.

18. The method of claim 16, wherein the recrystallization temperature is one of: (1) at least equal to the solidus boundary temperature plus 95% of the difference between the liquidus boundary temperature and the solidus boundary temperature, and (2) within 50° F. of the liquidus boundary temperature.

* * * * *